United States Patent [19]

Bird

[11] Patent Number: 5,361,983
[45] Date of Patent: Nov. 8, 1994

[54] METHOD OF MAXIMIZING THE EFFICIENCY OF AN ENVIRONMENTAL CONTROL SYSTEM INCLUDING A PROGRAMMABLE THERMOSTAT

[75] Inventor: Douglas D. Bird, Dayton, Minn.

[73] Assignee: Honeywell, Inc., Minneapolis, Minn.

[21] Appl. No.: 127,669

[22] Filed: Sep. 28, 1993

[51] Int. Cl.⁵ .............................................. F23N 5/20
[52] U.S. Cl. .................................. 236/46 R; 165/12
[58] Field of Search .................. 236/47, 46 R; 165/12

[56] References Cited

U.S. PATENT DOCUMENTS

| | | | |
|---|---|---|---|
| 4,172,555 | 10/1979 | Levine | 236/47 |
| 4,298,946 | 11/1991 | Hartsell et al. | 364/557 |
| 4,335,847 | 6/1982 | Levine | 236/46 R |
| 4,347,974 | 9/1982 | Pinckaers et al. | 236/46 R |
| 4,442,972 | 4/1984 | Sahay et al. | 236/1 EA |
| 4,469,274 | 9/1984 | Levine | 236/46 R |
| 4,522,336 | 6/1985 | Culp | 236/47 |
| 4,531,064 | 7/1985 | Levine | 307/66 |
| 4,557,317 | 12/1985 | Harmon, Jr. | 165/2 |
| 4,655,279 | 4/1987 | Harmon, Jr. | 165/2 |
| 4,702,413 | 10/1987 | Beckey et al. | 236/46 R |
| 4,725,001 | 2/1988 | Carney et al. | 236/11 |
| 4,828,016 | 5/1989 | Brown et al. | 165/12 |
| 4,897,798 | 1/1990 | Cler | 364/505 |
| 5,197,666 | 3/1993 | Wedekind | 236/46 R |
| 5,270,952 | 12/1993 | Adams et al. | 236/46 R |

*Primary Examiner*—William E. Wayner
*Attorney, Agent, or Firm*—Ian D. MacKinnon

[57] ABSTRACT

A process which is periodically executed by a programmable thermostat of a heating and cooling system which controls the temperature of a defined space within a structure subjected to a variable external environment. The process advances by an increment of time, $\Delta t$, when the set point temperature of the thermostat changes from an occupied set point temperature to an unoccupied set point temperature. The magnitude of $\Delta t$ is a function of the thermal lag of the structure, its external environment, and an amount of temperature change that is acceptable to occupants of the space. Each time the process is executed, the magnitude within predetermined limits of $\Delta t$ to be used the next time the process is executed is recalculated.

10 Claims, 3 Drawing Sheets

METHOD OF MAXIMIZING THE EFFICIENCY OF AN ENVIRONMENTAL CONTROL SYSTEM INCLUDING A PROGRAMMABLE THERMOSTAT

BACKGROUND OF THE INVENTION (1) Field of the Invention

This invention relates to environmental control systems for controlling the temperature of a space within a structure and, more particularly, to a method practiced by the programmable thermostat of such a system to utilize the thermal characteristics of the structure to increase the energy efficiency of the system.

(2) Description of Related Art

Heating and air-conditioning, or environmental control, systems function to maintain the interior temperature of a defined space within a structure at a particular nominal, or set point, temperature. Control by such a system is accomplished by the use of a thermostat which senses the temperature in the space within the structure. As the temperature deviates from a set point temperature, the thermostat activates the heating or cooling plants of the system to bring the temperature sensed by the thermostat back toward the set point temperature.

Currently, available programmable thermostats include a microprocessor, a random access memory (RAM), a read-only memory (ROM), and a clock. The microprocessors of such thermostats are programmed to perform, among other things, temperature set point changes at preprogrammed times. For example, when the system is in its heating mode, the current occupied set point temperature can be set back to an unoccupied, or lower, setback temperature at a programmed setback time to conserve energy while the space is unoccupied. When the system is in its cooling mode, the current occupied set point temperature can be advanced, or setup, to the unoccupied higher setup temperature at a programmed setup time.

The problem with existing programmable thermostats, particularly those used to control the temperature in a home, for example, is that they operate independently of the thermal characteristics of the structure of the home and the environment in which the structure is located. They do not take advantage of the fact that when heat, for example, is not supplied to a home that a certain amount of time is required before the temperature of the home begins to move toward the unoccupied temperature. This thermal lag is a result of the thermal mass of the home and its contents, and the current external environment of the home which includes air temperature, wind velocity and direction, and incident solar radiation. Programmable thermostats typically change the set point temperature to the unoccupied set point temperature at the beginning of the unoccupied period, the unoccupied set point time. By not taking advantage of the thermal lag, a structure exhibits vibration, noise and the sudden increase in air flow frequently associated with turning on the heating or cooling units of the system shortly before the thermostat changes its set point temperature from its occupied to unoccupied values. Further, by not utilizing the stored energy available from the thermal lag of the structure, all of the possible energy saving is not achieved.

SUMMARY OF THE INVENTION

The present invention provides a method, or process, by which a programmable thermostat of an environmental control system takes advantage of the thermal mass of a structure, such as that of a home, to save energy by advancing the time at which the set point temperature of the thermostat changes from an occupied set point temperature to an unoccupied set point temperature by a period of time, $\Delta t$, that it takes for the temperature within the structure to change by a given amount. The amount of the temperature change is limited to a maximum amount, $\max\Delta T°$, to maintain the temperature within the structure at a comfortable level during the period of time $\Delta t$. The magnitude of $\Delta t$ is a function of the thermal characteristics of the structure and of its environment and thus varies with time and of the magnitude of the desired maximum amount of temperature change, $\max\Delta T°$, without requiring additional data inputs to the programmable thermostat in addition to the temperature of the atmosphere of the space within the structure controlled by the system.

The program is executed periodically, and each time the set point of the thermostat changes from an occupied set point temperature to an unoccupied set point temperature, $\Delta t$ is calculated. In this program, $\Delta t$ is defined as the time period it takes for the temperature of the atmosphere of the space within the structure to change by a predetermined maximum amount, $\max\Delta T°$, from the occupied set point temperature beginning when the occupied set point temperature is changed to the unoccupied set point temperature. If the value of $\Delta t$ each time it is calculated is not greater than a predetermined maximum value, $\max\Delta t$, or less than a predetermined minimum value, $\min\Delta t$, the value of $\Delta t$ as calculated by the program is the value of $\Delta t$ used the next time the process of this invention is executed.

This invention provides a method, or process, practiced by a programmable thermostat for advancing the time that an unoccupied set point temperature becomes effective by a time period, $\Delta t$, that is a function of the thermal characteristics of a structure such as a home and its external environment.

This invention also provides a process which is periodically executed by a programmable thermostat of an environmental control system which advances the time that an unoccupied set point temperature following an occupied set point temperature becomes effective by a time period that is recalculated each time the program is fully executed by measuring the time it takes for the temperature in a space within the structure to change by a fixed number of degrees from the occupied set point temperature toward the unoccupied set point temperature.

Further, this invention provides a process which maximizes energy savings achieved by a programmable thermostat of an environment control system for a structure by advancing the time at which an unoccupied set point temperature becomes effective by a time period which is a function of the thermal lag of the structure and its external environment while maintaining the temperature within the structure at a comfortable level during said time period.

Other advantages of the present invention will be apparent from the following description of a preferred embodiment thereof, taken in conjunction with the accompanying drawings, although variations and modifications may be affected without departing from the spirit and scope of the novel concepts of the disclosure.

DESCRIPTION OF THE PREFERRED EMBODIMENT

Figure 1:
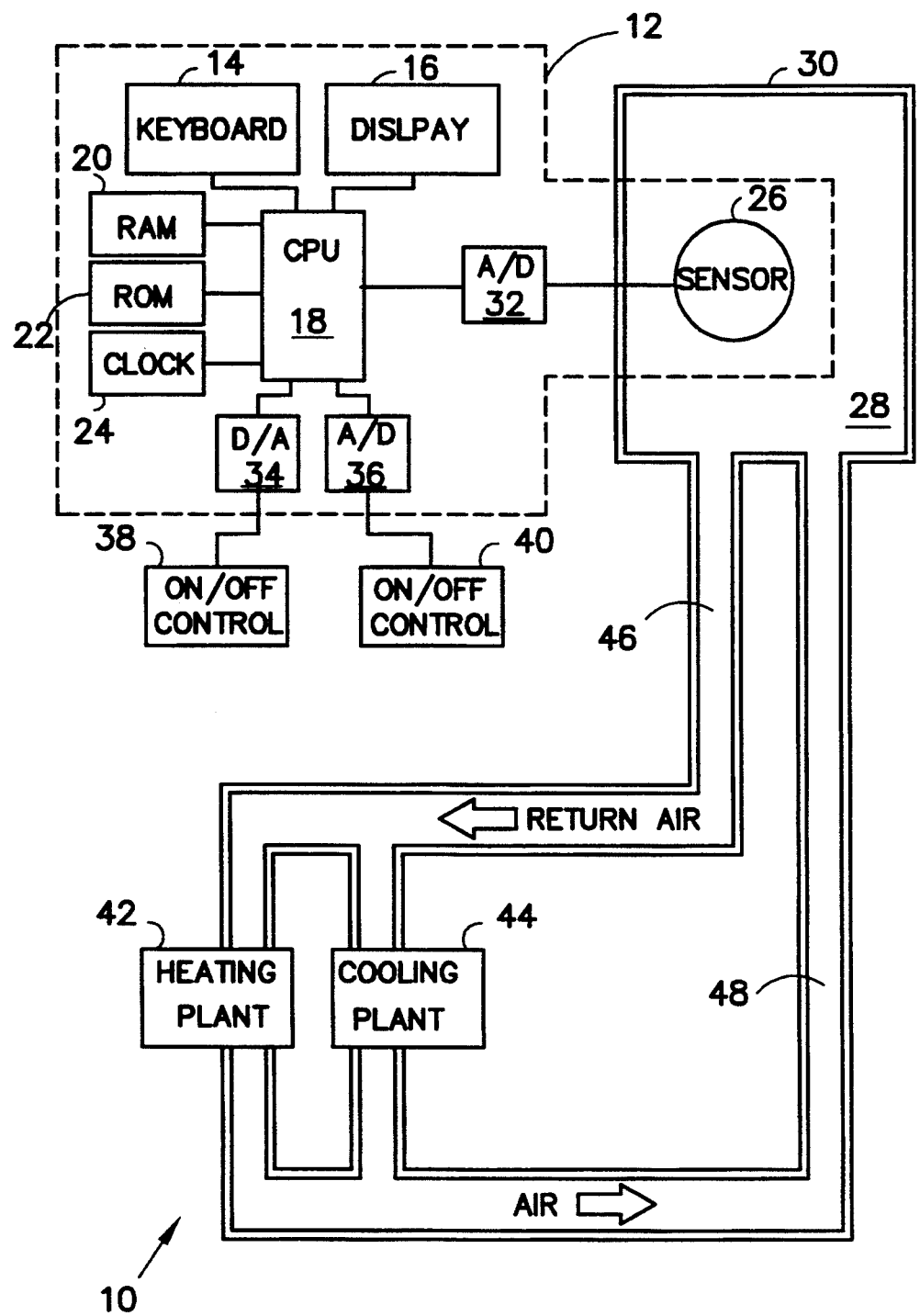
FIG. 1 is a schematic representation of an environment control system for a structure.

FIG. 1 is a block diagram of a conventional environmental control system 10. Thermostat 12 includes a keyboard 14 for entering desired data into thermostat 12 for each set point. Such set point data would include for each set point, the set point temperature and the set point time, the time that the set point temperature is to be effective. Display 16 displays information entered as well as other information needed or useful to occupants of the structure in which thermostat 12 is located. Thermostat 12 also includes a microprocessor, or central processor (CPU) 18, a random access memory (RAM) 20, a read-only memory (ROM) 22, a clock 24, and sensor 26. Clock 24 produces signals that represent increments of time so that the "time of day" is available to thermostat 12. Temperature sensor 26 senses the temperature of the atmosphere in space 28 within, or defined by, structure 30.

The processes that control the operation of CPU 18 are written into ROM 22, and variable data, or operands, such as set point temperatures and set point times, are written into RAM 20. CPU 18 receives binary signals representing the time of day, or current time, from clock 24. Typically, sensor 26 produces an analog voltage representing the temperature measured, or sensed, by sensor 26. This analog signal is converted to digital signals acceptable to CPU 18 by analog-to-digital (A/D) converter 32 which applies such digital temperature signals to CPU 18. When the temperature measured by sensor 26 deviates from the current, or active, set point temperature by a predetermined amount, CPU 18 will produce control signals that are applied to digital-to-analog (D/A) converters 34, 36, the analog outputs of which are applied to on/off controls, 38, 40 of heating unit 42 and cooling unit 44, respectively, depending upon whether system 10 is in a heating mode or in a cooling mode. In many systems the use of D/A converters such as converters 34, 36 is not required.

CPU 18 times the "on" and "off" periods of operation of heating unit 42 and cooling unit 44. Heating unit 42 and cooling unit 44 modify the air temperature of space 28 by circulating heated or cooled air by means of return air duct 46 and supply duct 48. Space 28, the temperature of the air of which is controlled by system 10, most commonly is either the living quarters of a home or an apartment, or a work area which generally comprises either a single or a group of rooms in a building.

Figure 2:
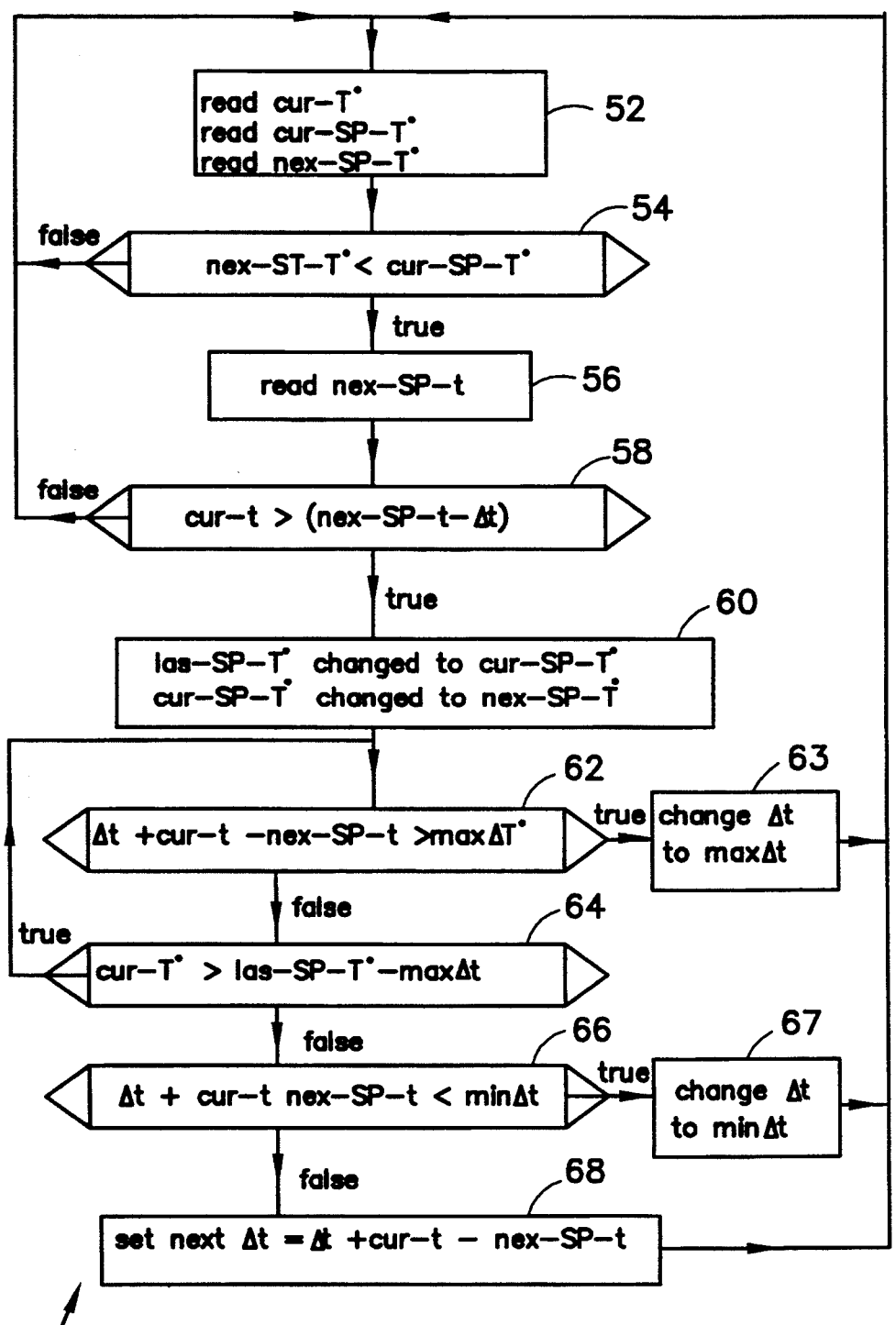
FIG. 2 is a flowchart of the program, or process, of the invention when the system is in its heating mode of operation.

The flowchart of FIG. 2 illustrates the steps of the method, or process 50, of the invention which is periodically executed by CPU 18 of thermostat 12. The machine instructions causing CPU 18 to execute the program are written into ROM 22 while the operands are written into RAM 20 since many of them can and do change with time. Examples of values of operands needed to execute the program when system 10 is in its heating mode are:

| Operands | Abbreviation | Example Heating Mode |
|---|---|---|
| current time | cur-t | |
| current temperature | cur-T° | |
| current set point temperature | cur-SP-T° | 73° F. |
| next set point temperature | nex-SP-T° | 65° F. |
| next set point time | nex-SP-t | 11:00 am |
| last set point time | las-SP-t | 6:00 am |
| last set point temperature | las-SP-T° | 63° F. |
| time differential | $\Delta t$ | 1.0 hr. |
| maximum temperature difference | max$\Delta T$° | 2.0° F. |
| maximum time differential | max$\Delta t$ | 4.0 hr. |
| minimum time differential | min$\Delta t$ | 0.25 hr. |

Since environmental control system 10 and thermostat 12 normally operate 24 hours a day and seven days a week, the flowchart of FIG. 2 is illustrated as closed loop control process 50 which is executed periodically, such as once every minute in the preferred embodiment. Further, it may be easier to understand the equations utilizing time of day by utilizing military time (i.e. a 24-hour clock). It should be noted that the flowchart of FIG. 2 assumes that system 10 is in a heating mode. The logical starting point to discuss the flowchart of FIG. 2 is step 52, the first, or initial, step of process 50. In executing step 52, CPU 18 obtains the current temperature (cur-T°) as measured by sensor 26, reads the current set point temperature (cur-SP-T°) which in the heating mode with the values found in the table supra is an occupied set point temperature, and the next set point temperature (nex-SP-T°) from RAM 20, which in this example is an unoccupied set point temperature. In step 54, CPU 18 determines if the nex-SP-T° is less than the cur-SP-T°. If the statement of step 54 is not true, or it is false, process 50 terminates. Once process 50 terminates, CPU 18 will continue to re-execute periodically, once every minute in the preferred embodiment, steps 52 and 54 until the statement of step 54 becomes true.

When the statement of step 54 becomes true, CPU 18 in step 56 reads from RAM 20 the next set point time (nex-SP-t) which is the on next on occupied set point time, 11.00 a.m. in this example. In step 58, CPU 18 determines if the cur-t is greater than nex-SP-t minus $\Delta t$. It should be noted that $\Delta t$ is initially assigned a value such as 1.0 hr. Thereafter, the value of $\Delta t$ is calculated by the program and the magnitude, or value, of $\Delta t$ is the time "t" to the nearest minute that it takes for the temperature in space 28 to vary by 2.0° F., max$\Delta T$°, from the current set point, 73° F. in the example. The magnitude of max$\Delta T$° is a temperature change which is below the threshold at which most people will sense a change in their personal comfort associated with the temperature in space 28. If the test of step 58 is not true, process 50 is terminated. Steps 52, 54, 56, and 58 will be executed repetitively until the statement of step 58 is true. When the test of step 58 becomes true, then the magnitude of the last set point temperature (las-SP-T°) stored in RAM 20 is made equal to that of the cur-SP-T°, and the magnitude of the cur-SP-T° stored in RAM 20 is changed to that of the nex-SP-T°.

Steps 62 and 64 constitute a subroutine of the program, the function of which is to determine the value of $\Delta t$ to be stored in RAM 20 for use in next execution of process 50. If the statement of step 62:

$$\Delta t + \text{cur-}t - \text{nex-}SP\text{-}t > \text{max}\Delta t$$

is true, then step 63 is executed. Step 63 causes the value of Δt written into RAM 20 to be made equal to the value of maxΔt, and process 50 terminates. If the statement of step 62 is false, step 64 is executed. Step 64 tests to see if:

$$cur\text{-}T° > las\text{-}SP\text{-}T° - \text{max}\Delta T°$$

is true or false. If the test of step 64 is true, steps 62 and 64 are repetitively reexecuted, once every minute in the preferred embodiment, until the results of step 62 is true; or the result of the execution of step 64 is false, which ever first occurs. If the statement of step 64 becomes false first, step 66 is executed. Step 64 checks to see if the statement:

$$\Delta t + cur\text{-}t - nex\text{-}SP\text{-}t < \text{min}\Delta t$$

is true or false. If step 66 is true, step 67 is executed which changes the value of Δt written into RAM 20 to equal that of minΔt, and terminates the process. If the result of executing step 66 is not true, then the value of Δt in RAM 20 is changed so that $$\Delta t = \Delta t + cur\text{-}t - nex\text{-}SP\text{-}t$$

and the process terminates.

Figure 3:
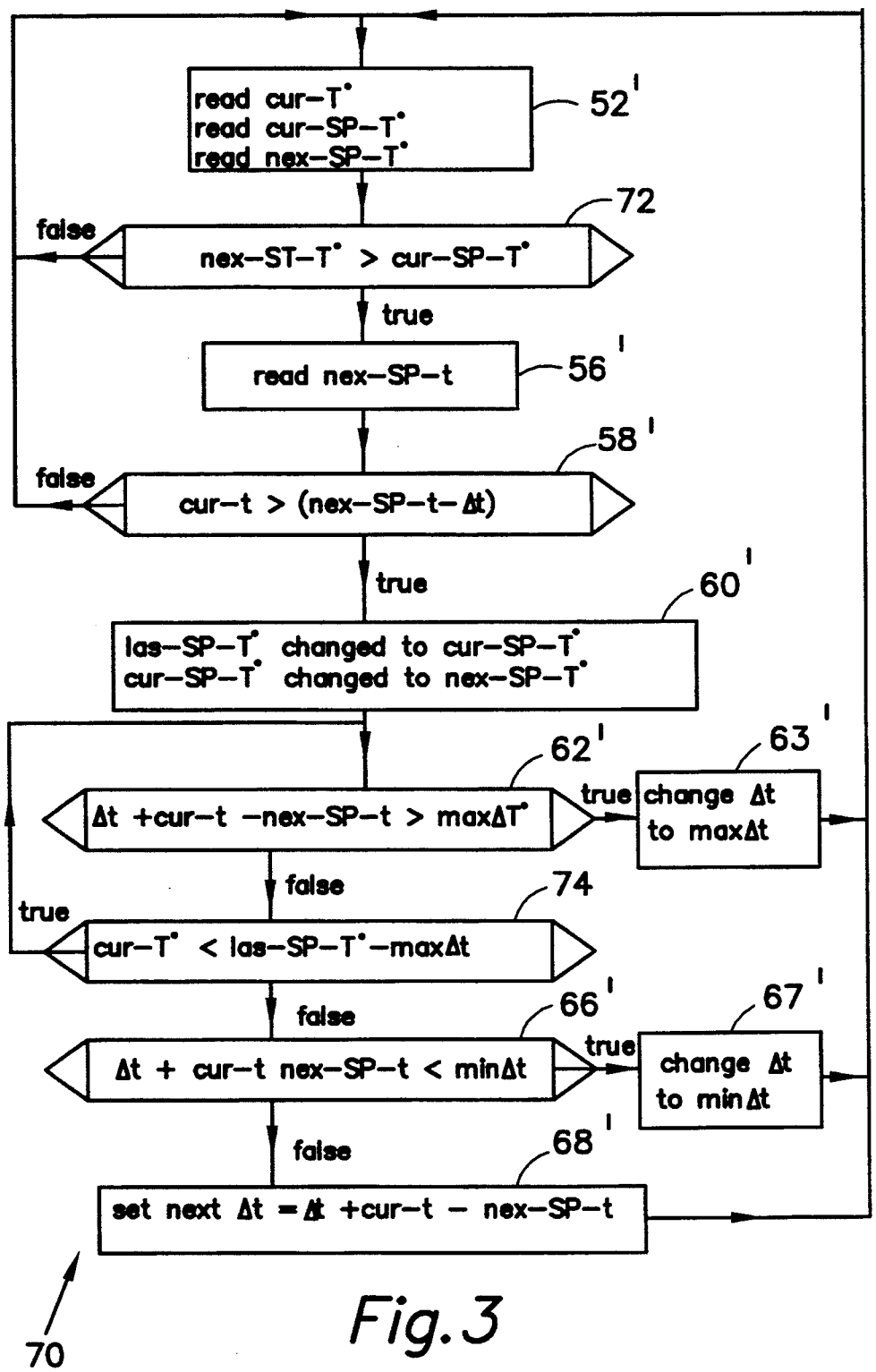
FIG. 3 is a flowchart of the process of the invention when the system is in its cooling mode of operation.

The flowchart of FIG. 3 illustrates the steps of the embodiment of the method, or process, of the invention periodically executed by CPU 18 when environmental control system 10 is in its cooling mode. When system 10 is in its cooling mode, a higher set point temperature corresponds to the more generic unoccupied set point temperatures while a lower set point temperature corresponds to an occupied set point temperature. All steps of process 70 identified by a primed reference numeral are the same as those of process 50 illustrated in FIG. 2. Step 72 of process 70 differs from step 54 of process 50 in that a greater-than symbol ">" is substituted for the less-than symbol "<". Step 74 differs from step 64 in that a "<" is substituted for a ">" and "+" is substituted for a "−".

It should be evident that various modifications can be made to the described embodiments without departing from the scope of the present invention.

What is claimed is:

1. The process by which a programmable thermostat of an environmental control system having a mode of operation for controlling the temperature of an area defined by a structure having a thermal mass and a variable external environment conserves energy, said thermostat having an occupied set point temperature and an occupied set point time, the time at which the occupied set point temperature becomes effective, and an unoccupied set point temperature and an unoccupied set point time, the time at which the unoccupied set point temperature becomes effective; comprising the steps of:
   a) determining if the next set point temperature is an unoccupied set point temperature;
   b) when step a is true, advancing the unoccupied set point time by an amount Δt, where Δt is a function of the thermal mass of the structure defining said area, and the structure's external environment;
   c) calculating a value for Δt each time step b, is executed by determining the time it takes for the temperature of the area defined by the structure to change from the occupied set point temperature to a temperature a given number of degrees closer to the unoccupied set point temperature;
   d) using the value of Δt calculated in step c, the next time the process is executed; and
   e) periodically repeating steps a through d.

2. The process of claim 1 in which the mode of operation of the environmental control system is a heating mode.

3. The process of claim 2 in which maximum and minimum values for Δt are established.

4. The process of claim 1 in which the mode of operation of the environmental control system is a cooling mode.

5. The process of claim 4 in which maximum and minimum values for Δt are established.

6. The process by which a programmable thermostat advances by a time period, Δt, the time at which an unoccupied set point temperature (un-SP-T°), following an occupied set point temperature (oc-SP-T°) becomes effective where the magnitude of Δt is a function of a structure's thermal characteristics and the structure's external environment comprising the steps of:
   a) periodically determining if an (un-SP-T°) follows an (oc-SP-T°);
   b) if step a is not true, terminating the process;
   c) if step a, is true, determining if the current time (cur-t) is greater the unoccupied set point time (un-SP-t) minus Δt;
   d) if step c is not true, terminating the process;
   e) if step c is true, setting the temperature (of oc-SP-T°) equal to that of a last set point temperature (las-SP-T°) and the (oc-SP-T°) equal to that of the (un-SP-T°) and determining if the equation:

$$\Delta t + (cur\text{-}t) - (un\text{-}SP\text{-}t) > \text{max}\Delta t$$

is true or false, where maxΔt is the maximum permitted value of Δt;
   f) if step e is true, the value of Δt is made equal to that of max Δt and the process is terminated;
   g) if step e is false, determining if:

$$(cur\text{-}T°) - (oc\text{-}SP\text{-}T°) < \text{max}\Delta T°;$$

is true or false, where maxΔT° is the maximum desired temperature deviation from the (cur-SP-T°) occurring during the time period Δt;
   h) If step g is true, repeat steps e, and g until step e becomes true, or step g becomes false, which ever first occurs;
   i) if step g becomes false before step e becomes true, determining if the equation:

$$\Delta t + (cur\text{-}t) - (oc\text{-}SP\text{-}t) < (\text{min}\Delta t)$$

is true or false, where minΔt is the minimum magnitude that Δt is permitted to have;
   j) if step i is true, the magnitude of Δt is made equal to that of minΔt and the process is terminated; and
   k) if step i is false, change the value of Δt to equal:

$$\Delta t + (cur\text{-}t) - (nex\text{-}SP\text{-}t)$$

and terminate the process.

7. The program of claim 6 in which the unoccupied set point temperature is lower than the occupied set point temperature.

8. The program of claim 6 in which the unoccupied set point temperature is higher than the occupied set point temperature.

9. A method for advancing the time a programmable thermostat of an environmental control system in a heating mode changes a set point from an occupied temperature to an unoccupied temperature as a function of a structure's thermal lag, comprising periodically executing the steps of:

a) determining if the next set point temperature (nex-SP-T°) is lower than the current set point temperature (cur-SP-T°);

b) when step a is true, determining if the current time (cur-t) is greater than the next set point time (nex-SP-t) minus $\Delta t$, where $\Delta t$ is an estimate of the time it is takes for the (cur-T°) to change by a predetermined magnitude, max$\Delta T°$, from the (cur-SP-T°);

c) when step b is true, changing the value of the last set point temperature (las-SP-T°) to that of the (cur-SP-T°) and that of the (cur-SP-T°) to that of the (nex-SP-T°), d) when step b is true and after completing step c, determining if the statement:

$$\Delta t + (cur\text{-}t) - (nex\text{-}SP\text{-}t) > max\Delta t$$

is true or false;

e) when step d is true, changing $\Delta t$ to equal max$\Delta t$ and terminating the program;

f) when step d is false, determining if $$(cur\text{-}T°) > (las\text{-}SP\text{-}T°) - max\Delta T°$$

is true or false;

g) when step f is true, repeat steps d and f until step d becomes true or step f becomes false, whichever occurs first; and h) when step f is false, determining if $$\Delta t + (cur\text{-}t) - (nex\text{-}SP\text{-}t) < min\Delta t$$

is true or false, where min$\Delta t$ is the minimum permitted value for $\Delta t$;

i) when step h is true, changing $\Delta t$ to equal min$\Delta t$, and terminating the program; and j) if step h becomes false before either of steps d or h become true, change $\Delta t$ to equal $\Delta t + (cur\text{-}t) - (nex\text{-}SP\text{-}t)$, and terminate the program.

10. A method for advancing the time a programmable thermostat of an environmental control system in a cooling mode changes a set point from an occupied temperature to an unoccupied temperature as a function of a structure's thermal lag comprising periodically executing the steps of:

a) determining if the next set point temperature (nex-SP-T°) is higher than the current set point temperature (cur-SP-T°);

b) when step a is true, determining if the current time (cur-t) is greater than the next set point time (nex-SP-t) minus $\Delta t$, where $\Delta t$ is an estimate of the time it is takes for the (cur-T°) to change by a predetermined magnitude, max$\Delta T°$, from the (cur-SP-T°);

c) when step b is true, changing the value of the last set point temperature (las-SP-T°) to that of the (cur-SP-T°) and that of the (cur-SP-T°) to that of the (nex-SP-T°), d) when step b is true and after completing step c, determining if the statement $$\Delta t + (cur\text{-}t) - (nex\text{-}SP\text{-}t) > max\Delta t$$

is true or false;

e) when step d is true, changing $\Delta t$ to equal max$\Delta t$ and terminating the program;

f) when step d is false, determining if $$(cur\text{-}T°) < (las\text{-}SP\text{-}T°) + max\Delta T°$$

is true or false;

g) when step f is true, repeat steps d and f until step d becomes true or step f becomes false, which ever occurs first;

h) when step f is false, determining if $$\Delta t + (cur\text{-}t) - (nex\text{-}SP\text{-}t) < min\Delta t$$

is true or false, where min$\Delta t$ is the minimum permitted value for $\Delta t$;

i) when step h is true, changing $\Delta t$ to equal min$\Delta t$, and terminating the program; and j) step h becomes false before either of steps d or h become true, change $\Delta t$ to equal $\Delta t + (cur\text{-}t) - (nex\text{-}SP\text{-}t)$, and terminate the program.

* * * * *